United States Patent
Nakayama et al.

(10) Patent No.: US 7,948,145 B2
(45) Date of Patent: May 24, 2011

(54) SWITCHED RELUCTANCE MOTOR

(75) Inventors: Seiji Nakayama, Obu (JP); Taku Itoh, Chita-gun (JP); Kiyoshi Kimura, Obu (JP)

(73) Assignee: Denso Corporation, Kariya (JP)

( * ) Notice: Subject to any disclaimer, the term of this patent is extended or adjusted under 35 U.S.C. 154(b) by 203 days.

(21) Appl. No.: 12/343,575

(22) Filed: Dec. 24, 2008

(65) Prior Publication Data
US 2009/0167119 A1    Jul. 2, 2009

(30) Foreign Application Priority Data
Dec. 27, 2007    (JP) .................................. 2007-337457

(51) Int. Cl.
*H02K 19/10* (2006.01)
*H02K 1/14* (2006.01)
*H02K 1/24* (2006.01)

(52) U.S. Cl. .................. 310/269; 310/168; 310/216.092

(58) Field of Classification Search .................. 310/168, 310/49.43, 49.44, 254.1, 269, 216.016, 216.057
See application file for complete search history.

(56) References Cited

U.S. PATENT DOCUMENTS

| | | | | |
|---|---|---|---|---|
| 4,166,966 A | * | 9/1979 | Wittlinger et al. | 310/111 |
| 4,280,072 A | * | 7/1981 | Gotou et al. | 310/67 R |
| 4,516,048 A | * | 5/1985 | Brigham | 310/216.094 |
| 5,239,217 A | * | 8/1993 | Horst | 310/51 |
| 5,294,856 A | * | 3/1994 | Horst | 310/181 |
| 5,331,245 A | * | 7/1994 | Burgbacher et al. | 310/186 |
| 5,604,388 A | * | 2/1997 | Baker et al. | 310/51 |
| 6,230,576 B1 | * | 5/2001 | Yamada et al. | 74/335 |
| 6,441,529 B1 | * | 8/2002 | Mimura et al. | 310/216.074 |
| 6,744,171 B1 | * | 6/2004 | Kolomeitsev | 310/254.1 |
| 2001/0048264 A1 | * | 12/2001 | Trago et al. | 310/254 |
| 2005/0116679 A1 | | 6/2005 | Ramu | |
| 2005/0146304 A1 | | 7/2005 | Ramu | |
| 2005/0151437 A1 | | 7/2005 | Ramu | |
| 2005/0154545 A1 | | 7/2005 | Ramu et al. | |
| 2005/0156475 A1 | | 7/2005 | Ramu et al. | |
| 2007/0273322 A1 | | 11/2007 | Ramu | |

FOREIGN PATENT DOCUMENTS

| | | |
|---|---|---|
| JP | 2000-166198 | 6/2000 |
| JP | 2002-010595 | 1/2002 |

OTHER PUBLICATIONS

Japanese Office Action mailed Aug. 4, 2009 issued in corresponding Japanese Appln. No. 2007-337457, with English translation.

* cited by examiner

*Primary Examiner* — Burton Mullins
(74) *Attorney, Agent, or Firm* — Nixon & Vanderhye PC

(57) ABSTRACT

A plurality of concavities and convexities is provided on tips of all rotor teeth 24 of the SR motor 5. Depths of the concave portions α are deep on an edge side where a stator tooth 23 and rotor tooth 24 first approach and are shallow as a facing area between the stator tooth 23 and rotor tooth 24 increases. Therefore, magnetic resistance between the stator tooth 23 and rotor tooth 24 becomes high at an early stage of the stator tooth 23 and rotor tooth 24 facing each other and becomes low as the facing area between the stator tooth 23 and rotor tooth 24 increases. As a result, torque fluctuation can be suppressed at a time of a large current and a minimum generation torque can be increased at a time of a small current.

11 Claims, 9 Drawing Sheets

SWITCHED RELUCTANCE MOTOR

CROSS REFERENCE TO RELATED APPLICATION

This application is based on and claims priority from Japanese Patent Application No. 2007-337457 filed on Dec. 27, 2007, the contents of which are incorporated herein by reference.

FIELD OF THE INVENTION

This invention relates to a switched reluctance motor (hereinafter, referred to as an SR motor) usable as a rotary actuator.

BACKGROUND OF THE INVENTION

In recent years, an SR motor which is compact and has a high output torque has been used as, for example, an actuator for various systems mounted on a vehicle in many cases. One example in which the SR motor is used in a shift range switching apparatus (shift by wire: SBW) is described below.

An automatic transmission of the vehicle has the shift range switching apparatus (including a parking switching mechanism). Although a driver manually shifted gear ranges formerly, the shift range switching apparatus in which an SBW actuator having the SR motor switches a shift range switching unit has been recently spreading in the market.

(Problem 1)

The output torque of the SR motor is expressed by the following equation.

$$T = 0.5 I^2 \times dL/d\theta$$

wherein T is the output torque, I is a current, L is an inductance of a coil, and θ is a rotation angle.

As described above, the output torque (T) of the SR motor varies depending on the current (T) flowing though the coil and the changing rate of inductance (dL/dθ).

Figure 2A:
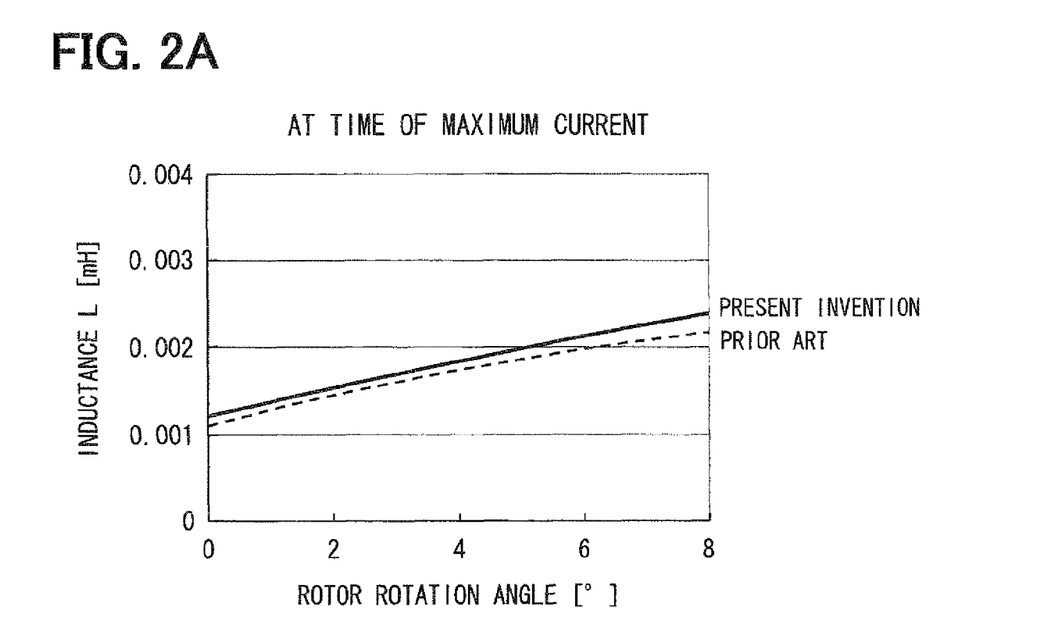
FIG. 2A is a graph showing a relationship between an inductance and rotor rotation angle at the time of a maximum current.
Figure 2B:
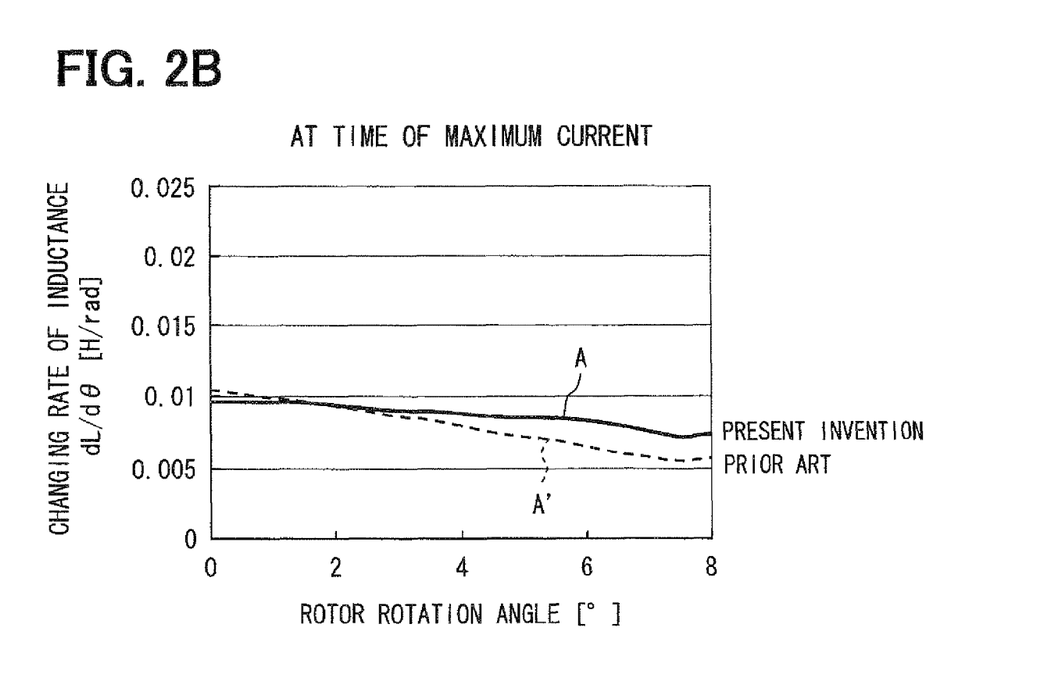
FIG. 2B is a graph showing a relationship between a changing rate of inductance and rotor rotation angle at the time of the maximum current.

When a large current flows though the coil, as shown by a dotted line A' in FIG. 2B (θ=0° represents an angle at which a stator tooth and rotor tooth begin to face each other), the changing rate of inductance (dL/dθ) lowers due to magnetic saturation as a facing area between the stator tooth and rotor tooth increases. At this time, because the current is large, the fluctuation of the output torque becomes large. That is, as shown by a dotted line B' in FIG. 4, the output torque of the SR motor sharply falls off as the facing area between the stator tooth and rotor tooth increases. As described above, when the large current is given to the coil, there is a problem that large torque fluctuation (torque ripple) occurs.

(Problem 2)

Figure 3A:
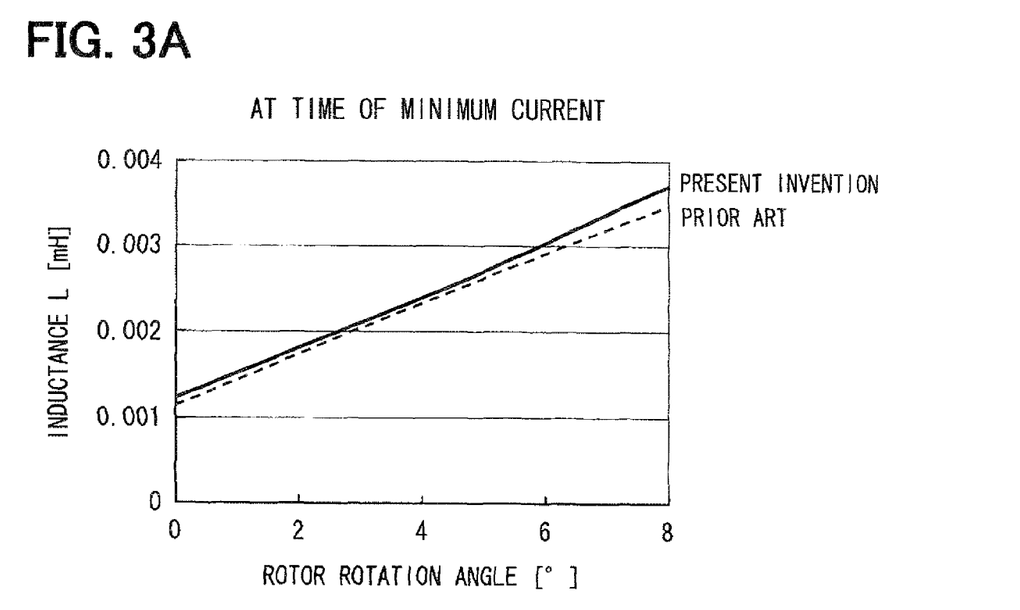
FIG. 3A is a graph showing a relationship between an inductance and rotor rotation angle at the time of a minimum current.
Figure 3B:
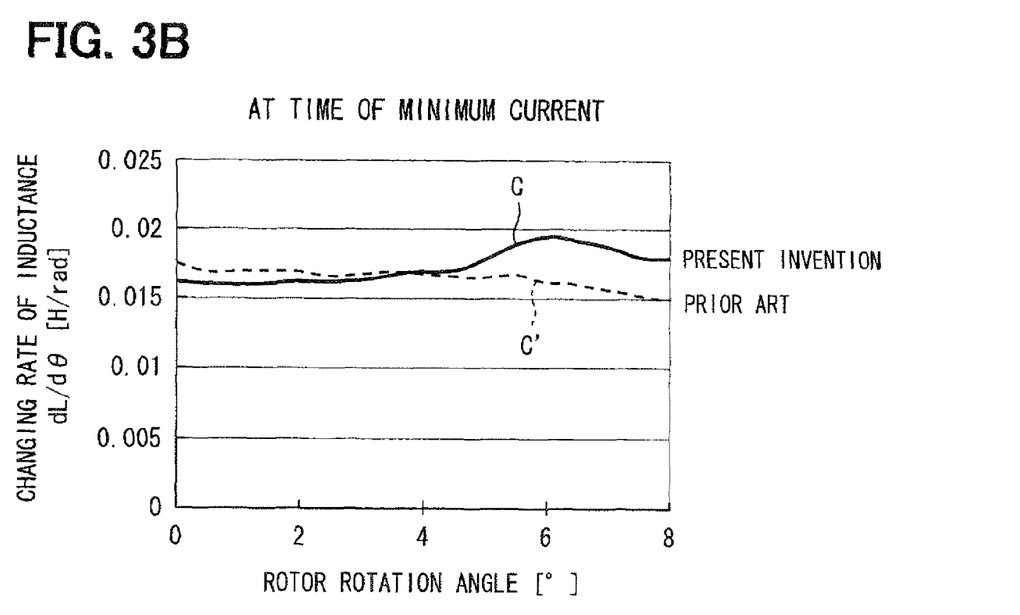
FIG. 3B is a graph showing a relationship between a changing rate of inductance and rotor rotation angle at the time of the minimum current.

Conversely, when a small current is given to the coil, as shown by a dotted line C' in FIG. 3B, the changing rate of inductance (dL/dθ) lowers as the facing area between the stator tooth and rotor tooth increases. However, because the current is small, the fluctuation of the output torque becomes small. That is, as shown by a dotted line D' in FIG. 4, the output torque of the SR motor fluctuates within a narrow range in the whole region of a rotor rotation angle.

Figure 4:
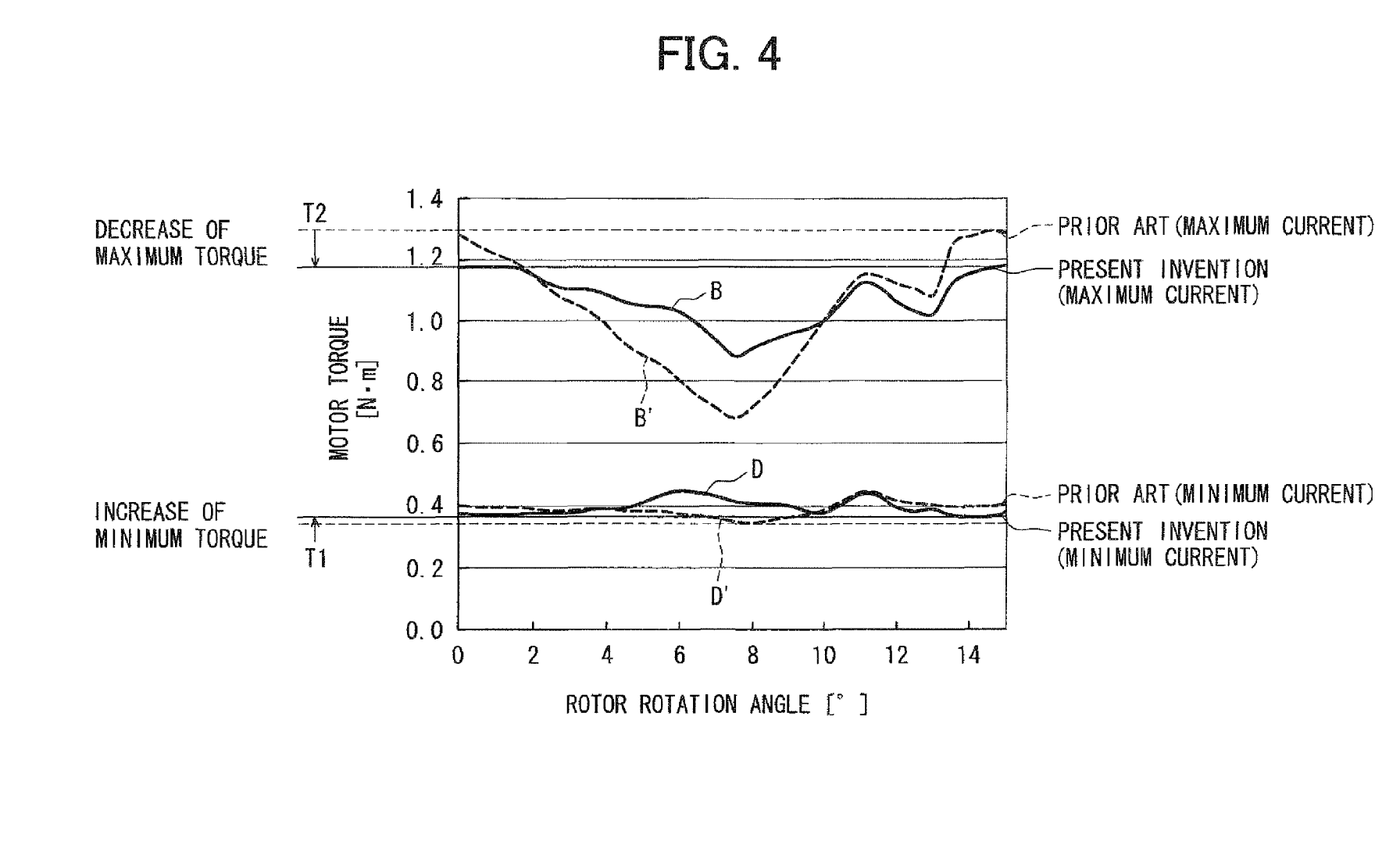
FIG. 4 is a graph showing a relationship between an output torque of an SR motor and rotor rotation angle.

However, even though the current is small, as shown by the dotted line D' in FIG. 4, the output torque falls off as the facing area between the stator tooth and rotor tooth increases, as the result that the changing rate of inductance (dL/dθ) lowers as the facing area increases. That is, when the small current is given to the coil, the fluctuation of the output torque can be suppressed, but the output torque falls off as the facing area increases.

(Problem 3)

The current flowing through the coil of the SR motor varies in response to a "battery condition" or "temperature". When the temperature is high, the output torque becomes low since the electrical resistance of the coil becomes high. Also, when the battery voltage is low, the output torque becomes low since the current of the coil decreases. For these reasons, when the temperature is high and the battery voltage is low, the current of the SR motor becomes minimum (high temperature×low voltage=minimum current).

The SR motor installed in the shift range switching apparatus is required to generate a necessary torque under the worst condition of the "high temperature×low voltage=minimum current". However, if the necessary torque is ensured under the worst condition of the "high temperature×low voltage=minimum current", the SR motor generates an excessive output torque under the opposite (best) condition of "low temperature×high voltage=maximum current". As a result, there is a possibility that loads (objects driven by the SR motor including a rotation transfer system between the SR motor and the driven objects) are mechanically damaged.

For example, as shown by the dotted line B' in FIG. 4, there is the possibility of the loads mechanically damaged as the result of the excessive output torque generated near the angle at which the stator tooth and rotor tooth begin to face each other at the time of the maximum current.

Figure 11A:
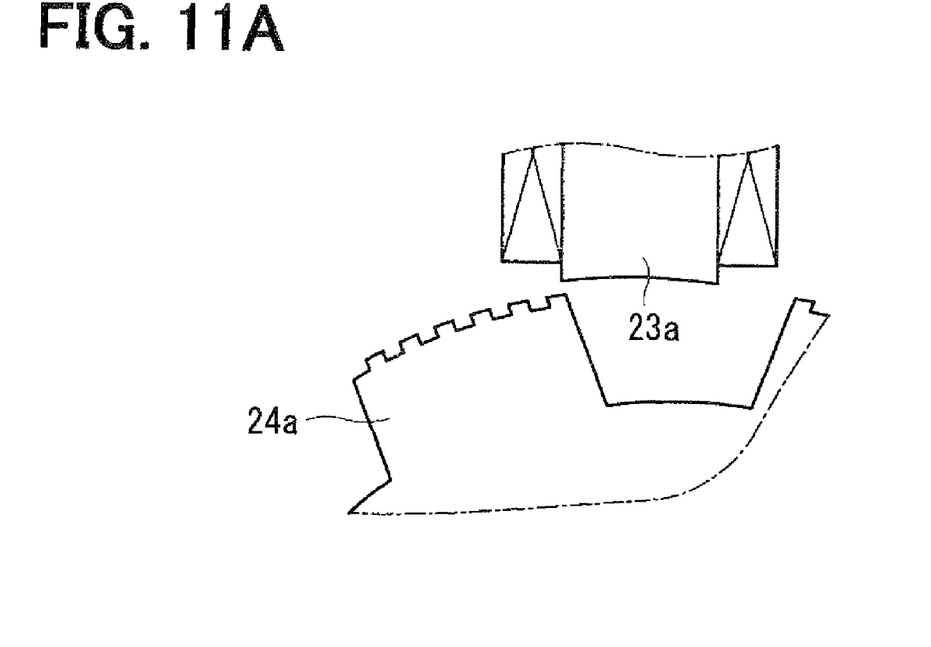
FIG. 11A is an enlarged diagram of a rotor tooth 24a which is one of rotor teeth forming a pair and a stator tooth 23a magnetically attracting the rotor tooth 24a in the prior art.
Figure 11B:
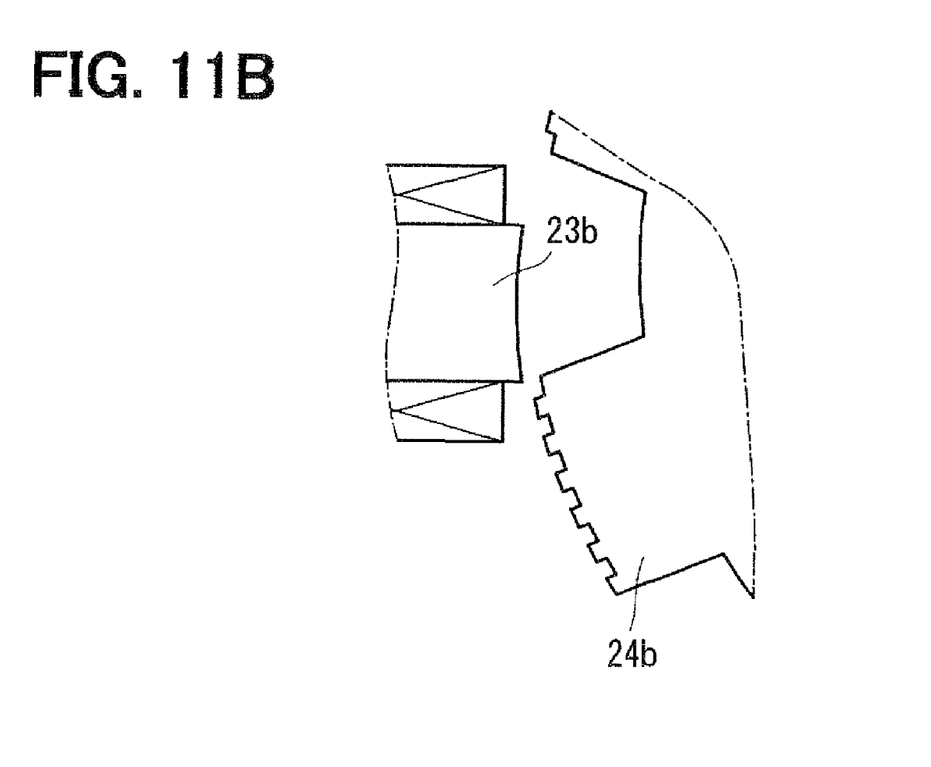
FIG. 11B is an enlarged diagram of a rotor tooth 24b which is the other of the rotor teeth forming the pair and a stator tooth 23b magnetically attracting the rotor tooth 24b in the prior art.

In order to suppress the torque ripple and to decrease the maximum torque, Japanese Patent Publication No. 2002-10595 discloses a switched reluctance motor as shown in FIGS. 11A, 11B, in which an uneven section is formed at the tip of the rotor tooth 24a (24b) (or stator tooth 23a (23b)) and concavities and convexities of the uneven section in a pair of rotor teeth 24a, 24b (forming a magnetic loop) are arranged in opposite phase.

However, the above-described switched reluctance motor can not sufficiently solve the problems that the large torque fluctuation occurs and the excessive output torque is generated when the large current (particularly, maximum current) flows though the coil.

SUMMARY OF THE INVENTION

It is therefore the first object of the present invention to provide an SR motor capable of suppressing torque fluctuation when a large current is given to a coil. The second object of the present invention is to provide an SR motor capable of increasing a minimum generation torque when a small current is given to the coil. And, the third object of the present invention is to provide an SR motor capable of preventing an excessive output torque from being generated when the large current is given to the coil.

An SR motor according to the present invention has a plurality of concavities and convexities alternately formed at a tip of a rotor tooth or stator tooth along a rotation direction of a rotor. The depths of the concavities are deep on an edge side where the stator tooth and rotor tooth first approach when the rotor rotates and are shallow toward the direction in which a facing area between the stator tooth and rotor tooth increases.

Because the depths of the concavities are deep on the edge side where the stator tooth and rotor tooth first approach, an average air gap between the stator tooth and rotor tooth becomes wide at an early stage of the stator tooth and rotor tooth facing each other. By this means, because magnetic resistance between the stator tooth and rotor tooth becomes high, a changing rate of inductance can be made small, so that the maximum generation torque can be suppressed.

In addition, because the depths of the concavities are shallow as the facing area between the stator tooth and rotor tooth increases, the average air gap becomes narrow. By this means, because the magnetic resistance between the stator tooth and rotor tooth becomes low, the changing rate of inductance can be made large, so that the drop of the output torque can be suppressed.

In this way, the maximum generation torque can be suppressed at the early stage of the stator tooth and rotor tooth facing each other when a large current is given to the coil, and the drop of the output torque can be suppressed as the facing area increases, so that torque fluctuation can be suppressed when the large current is given to the coil.

When a small current is given to the coil, according to the prior art, the output torque lowers as the facing area between the stator tooth and rotor tooth increases.

To the contrary, according to the present invention, because the concavities are made shallow as the facing area between the stator tooth and rotor tooth increases, the average air gap becomes narrow. By this means, because the magnetic resistance between the stator tooth and rotor tooth becomes low, the changing rate of inductance can be made large, so that the drop of the output torque can be suppressed when the facing area between the stator tooth and rotor tooth increases. In this way, a minimum generation torque can be increased when the small current is given to the coil.

As described above, because the concavities are made deep on the edge side where the stator tooth and rotor tooth first approach, the average air gap between the stator tooth and rotor tooth becomes wide at the early stage of the stator tooth and rotor tooth facing each other. By this means, because the magnetic resistance between the stator tooth and rotor tooth becomes high, a changing rate of inductance can be made small, so that the maximum generation torque can be suppressed.

In this way, because the maximum generation torque can be suppressed at the early stage of the stator tooth and rotor tooth facing each other when the large current is given to the coil, an excessive output torque can be prevented from being generated at a time of the large current (particularly, maximum current). As a result, it is possible to avoid the possibility that loads driven by the SR motor are mechanically damaged.

It is preferable that orders of the concavities and convexities formed in a pair of stator teeth (or rotor teeth) are in opposite relation (in opposite phase) along a rotation direction of the rotor. By this means, when the facing area between the stator tooth and rotor tooth changes in response to the rotation of the rotor, air gaps between the stator teeth and rotor teeth become narrow by the convexity on one of the pair and become wide by the concavity on another of the pair. By this means, a changing degree of the air gap can be made small and thereby torque fluctuation caused by the concavities and convexities can be prevented from being generated.

It is preferable that the rotor is rotatable in normal and reverse directions, and the depths of the concavities are deep on both edge sides of the tip of the stator tooth (or rotor tooth) and shallow toward a mid section of the tip along the rotation direction of the rotor. By this means, even if the SR motor rotates in a normal or reverse direction, the above-described effects can be obtained.

These and other features and advantages of the present invention will become more apparent upon reading the following detailed description and upon reference to the accompanying drawings.

BRIEF DESCRIPTION OF THE DRAWINGS

FIG. 1A is an enlarged diagram of a rotor tooth 24a which is one of rotor teeth forming a pair and a stator tooth 23a magnetically attracting the rotor tooth 24a;

DETAILED DESCRIPTION OF THE PREFERRED EMBODIMENTS

An SR motor includes a stator which has a plurality of stator teeth, and a rotor which has a plurality of rotor teeth. Rotation force is given to the rotor by a pair of the rotor teeth among the plurality of the rotor teeth magnetically attracted by a pair of the stator teeth among the plurality of the stator teeth. When the pair of the stator teeth magnetically attracting the pair of the rotor teeth is successively switched, the rotor rotates.

The SR motor according to the preferred embodiment has a plurality of concavities and convexities alternately formed at a tip of a rotor tooth or stator tooth along a rotation direction of the rotor. The depths of the concavities are deep on an edge side where the stator tooth and rotor tooth first approach when the rotor rotates and are shallow toward the direction in which a facing area of the stator tooth and rotor tooth increases. It is preferable that orders of the concavities and convexities formed in the pair of the rotor teeth (or stator teeth) are in opposite relation (in opposite phase) along a rotation direction of the rotor.

In addition, it is preferable that, if the rotor is of a type rotatable in both normal and reverse directions (including a type of no designation of a rotation direction), the depths of the concavities are deep on both edge sides of the tip of the rotor tooth (or stator tooth) and shallow toward a mid section of the tip along the rotation direction of the rotor.

The embodiment in which the SR motor according to the present invention is applied to an SR motor of an SBW actuator used in a shift range switching apparatus will be described with reference to FIG. 1 to FIG. 10.

(Description of Shift Range Switching Apparatus)

Figure 6:
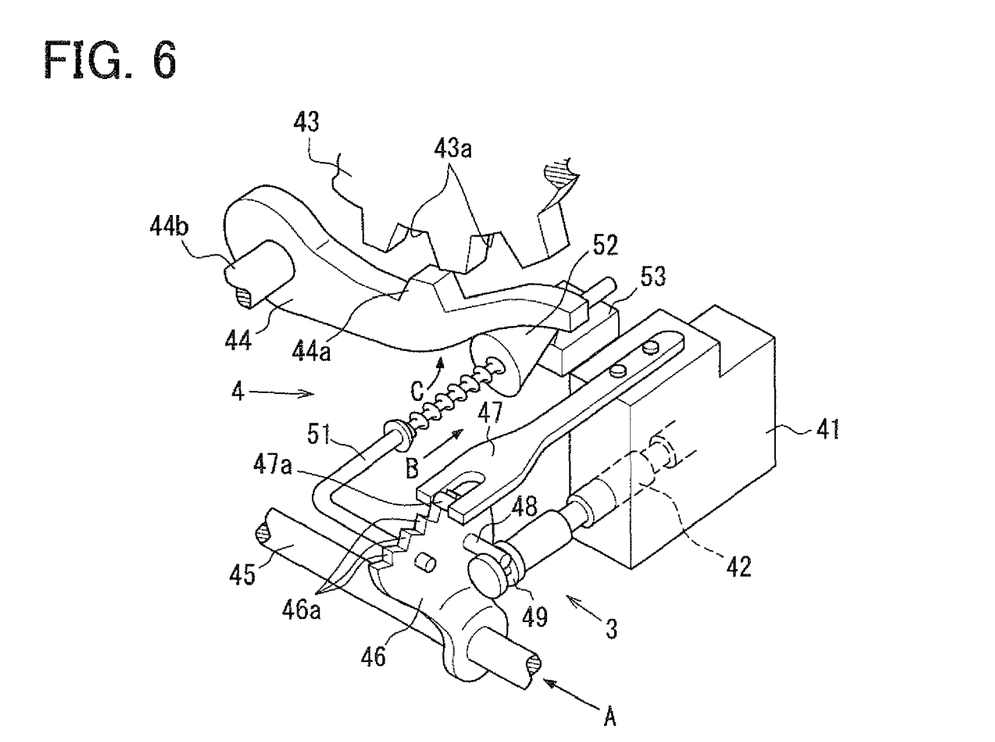
FIG. 6 is a perspective view of an assembly of a parking switching unit and a shift range switching unit.
Figure 7:
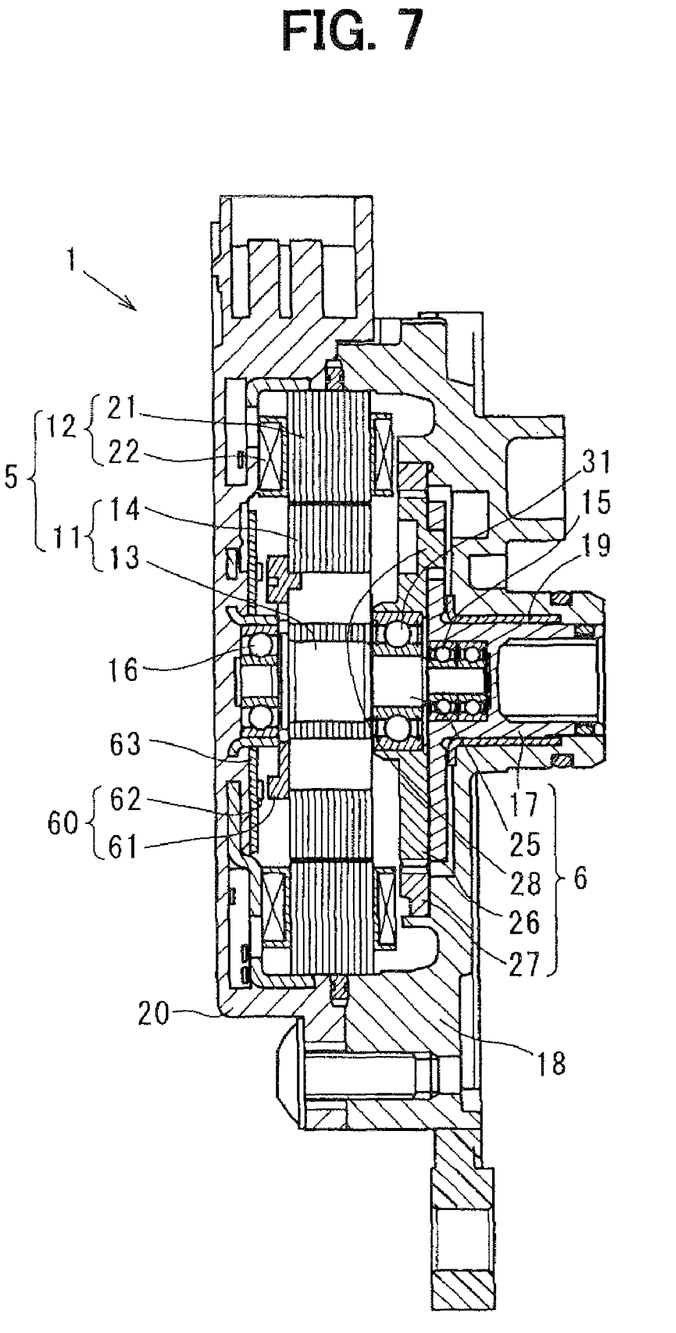
FIG. 7 is a cross-sectional view of an SBW actuator.

The shift range switching apparatus switches a shift range switching unit 3 and parking switching unit 4 (see FIG. 6) mounted on a vehicular automatic transmission 2 (see FIG. 5) by the SBW actuator 1 (see FIG. 7).

The SBW actuator 1 forms a servo mechanism for driving the shift range switching unit 3 and, as shown in FIG. 7, is composed of a synchronous SR motor 5 and a reduction gear unit 6 for reducing a rotation speed of the SR motor 5. An SBW ECU 7 shown in FIG. 5 controls the rotation of the SR motor 5. That is, the shift range switching apparatus carries out switching control of the shift range switching unit 3 and parking switching unit 4, which are driven via the reduction gear unit 6 by the SBW ECU 7 controlling a rotation direction, a number of rotations, and rotation angle of the SR motor 5.

Next, a detailed structure of the shift range switching apparatus will be described. It is to be noted that, in the following description, the SBW actuator 1 is explained while defining a right side of FIG. 7 as a front side and a left side of FIG. 7 as a rear side, but such definitions have no relation with an actual mounting direction.

(Description of SR Motor 5)

The SR motor 5 will be explained with reference to FIG. 7. The SR motor 5 of this embodiment is a brushless SR motor without a permanent magnet and composed of a rotor 11 supported rotatably, and a stator 12 disposed on a same axis as a rotation center of the rotor 11.

The rotor 11 is composed of a rotor shaft 13 and a rotor core 14. The rotor shaft 13 is rotatably supported by ball bearings arranged at a front and rear ends (front ball bearing 15, rear ball bearing 16). The front ball bearing 15 is fitted and fixed in an inside wall of an output shaft 17 of the reduction gear unit 6. The output shaft 17 of the reduction gear unit 6 is rotatably supported by a metal bearing 19 arranged at an inside wall of a front housing 18. That is, the front end of the rotor shaft 13 is rotatably supported via the metal bearing 19 provided in the front housing 18, the output shaft 17 and the front ball bearing 15.

A supporting section in an axis direction of the metal bearing 19 is set so as to overlap with a supporting section in the axis direction of the front ball bearing 15. By this means, an inclination of the rotor shaft 13 caused by reaction force of the reduction gear unit 6 (in more details, reaction force of load imposed on contacts of a sun gear 26 and a ring gear 27 described later) can be prevented.

The rear ball bearing 16 is press-fitted and fixed on a periphery of a rear end of the rotor shaft 13 and supported by a rear housing 20.

The stator 12 is composed of a stator core 21 fixed in a housing (front housing 18+rear housing 20) and plural phases of exciting coils 22 generating magnetic force when electric power is supplied (energized).

The stator core 21 is formed by laminating a plurality of thin plates obtained by stamping out a thin plate made of iron into a predetermined shape by press working and is fixed to the rear housing 20. In more details, stator teeth 23 (inner salient poles) are formed in the stator core 21 so as to project toward an inside rotor core 14 at each predetermined angle (for example, each 30 degrees). Each of stator teeth 23 is provided with the exiting coil 22 for generating the magnetic force at each stator tooth 23.

The rotor core 14 is formed by laminating a plurality of thin plates obtained by stamping out a thin plate made of iron into a predetermined shape by press working and is press-fitted and fixed to the rotor shaft 13. Rotor teeth (outer salient poles) 24 are formed in the rotor core 14 so as to project toward the outside stator core 21 at each predetermined angle (for example, each 45 degrees).

Figure 8:
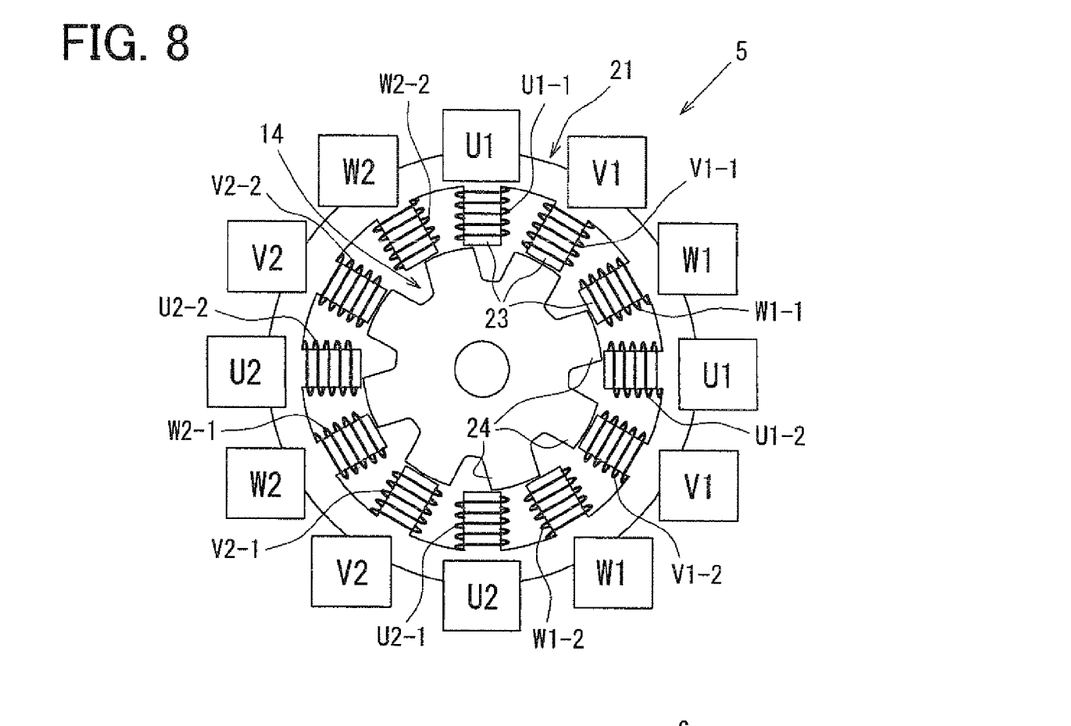
FIG. 8 is a schematic diagram of the SR motor.

Next, an example of the exciting coil 22 will be explained with reference to FIGS. 8, 9. Coils U1, V1, W1 belonging to a first system 22A and coils U2, V2, W2 belonging to a second system 22B, which are for generating magnetic force at each of the stator teeth 23, are wound around each of the stator teeth 23. Coils U1, U2 are a U-phase coil, coils V1, V2 are a V-phase coil, and coils W1, W2 are a W-phase coil.

Figure 9:
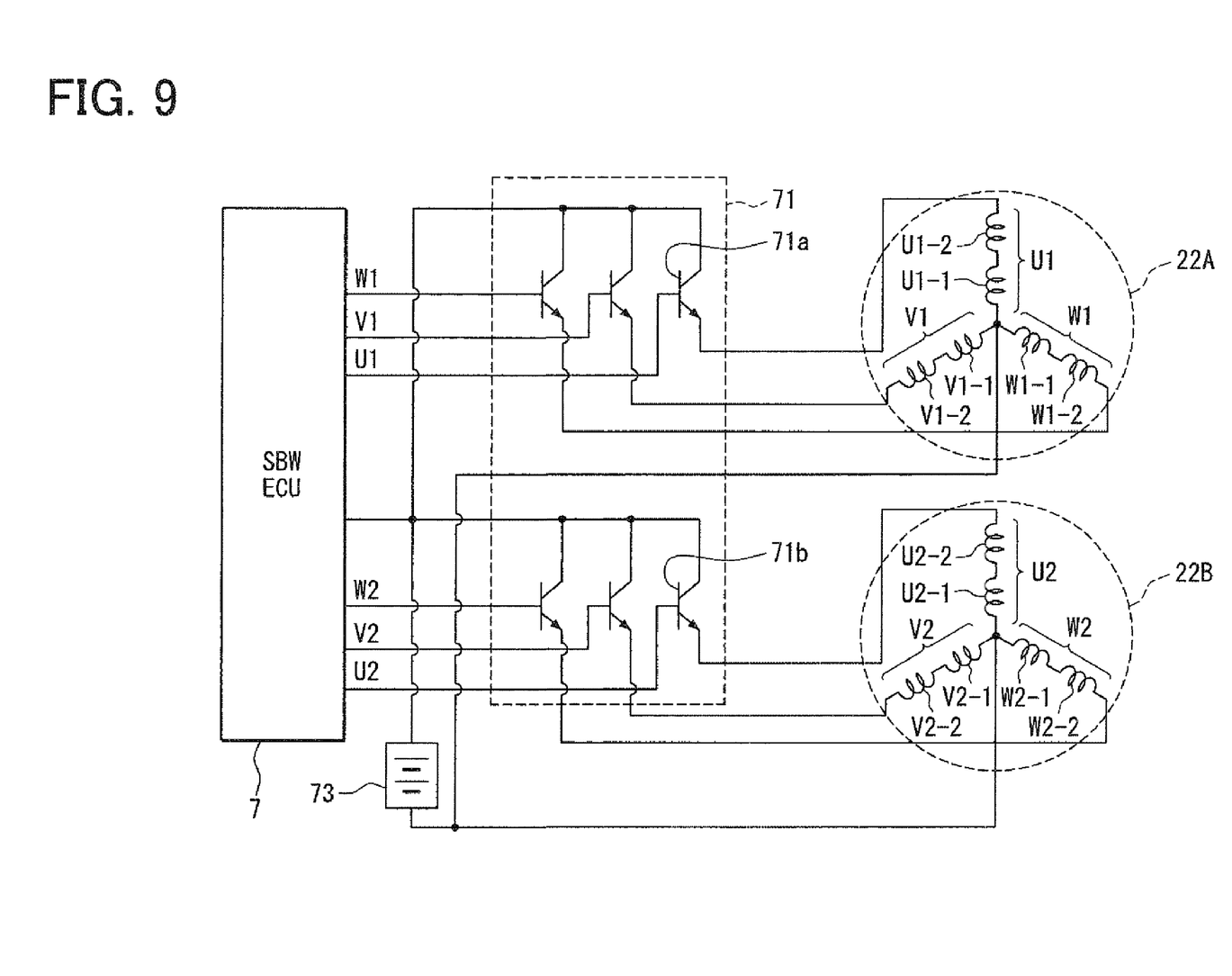
FIG. 9 is a circuit diagram for supplying current to the SR motor.

As shown in FIG. 9, the exciting coil 22 includes the coils U1, V1, W1 of the first system 22A and the coils U2, V2, W2 of the second system 22B, which are electrically separated from each other. The coils U1, V1, W1 of the first system 22A and the coils U2, V2, W2 of the second system 22B are star-connected respectively. The rotor 11 is constructed so as to be driven by only energizing control of the coils U1, V1, W1 of the first system 22A or only energizing control of the coils U2, V2, W2 of the second system 22B. The energizing control of the coils U1, V1, W1 of the first system 22A and energizing control of the coils U2, V2, W2 of the second system 22B may be simultaneously carried out to drive the rotor 11.

The coils U1, V1, W1 of the first system 22A and the coils U2, V2, W2 of the second system 22B are each divided into plural sections (two sections in this embodiment). In more details, the coils U1, V1, W1 of the first system 22A are composed of coils U-1, V1-1, W1-1 of a first set each wound around the stator teeth 23 lining up in the rotation direction and coils U1-2, V1-2, W1-2 of a second set each wound around the stator teeth 23 lining up in the rotation direction, following to the stator teeth 23 around which the coils U1-1, v1-1, W1-1 of the first set wound.

Also, the coils U2, V2, W2 of the second system 22B are composed of coils U2-1, V2-1, W2-1 of a first set each wound around the stator teeth 23 lining up in the rotation direction and coils U2-2, V2-2, W2-2 of a second set each wound around the stator teeth 23 lining up in the rotation direction, following to the stator teeth 23 around which the coils U2-1, V2-1, W2-1 of the first set is wound.

When current is given to the exciting coil 22, coils of each set produce magnetic poles of which polarities are opposite to each other. For example, when the coil U1-1 (V1-1 or W1-1) of the first set in the first system 22A produces N-pole, the coil U1-2 (V1-2 or W1-2) of the second set adjacent to the first set produces S-pole, the coil U2-1 (V2-1 or W2-1) of the first set in the second system 22B adjacent to the second set in the first system 22A produces N-pole, and the coil U2-2 (V2-2 or W2-2) of the second set adjacent to the first set produces S-pole.

Therefore, if two coils U1-1, U1-2 are energized, N-pole is induced at an interior end of the stator tooth 23 (one of two stator teeth 23 distant from each other by 90 degrees in the rotation direction) around which the coil U1-1 is wound and S-pole is induced at an interior end of the stator tooth 23 (another of two stator teeth 23) around which the coil U1-2 is wound. In the same manner, the coils V1, W1, U2, V2, W2 of each set in the other phase produce magnetic poles of which polarities are opposite to each other at two stator teeth 23 distant by 90 degrees in the rotation direction.

Rotation force is given to the rotor 11 as the result that a pair of the rotor teeth 24 is magnetically attracted by a pair of the stator teeth 23 magnetized by the exciting coil 22, which is selectively energized by a coil driving circuit 71 described later. The rotor 11 rotates as the result that the coil driving circuit 71 successively switches the exciting coil 22 by which the pair of the stator teeth 23 is magnetized so as to magnetically attract the pair of the rotor teeth 24. That is, when an energizing position and direction of the exciting coils 22 having the U-phase coil, V-phase coil and W-phase coil are sequentially switched, the stator teeth 23 magnetically attracting the rotor teeth 24 are sequentially changed, and thereby, the rotor 11 rotates in one direction or the other direction.

(Description of Reduction Gear Unit 6)

Figure 10:
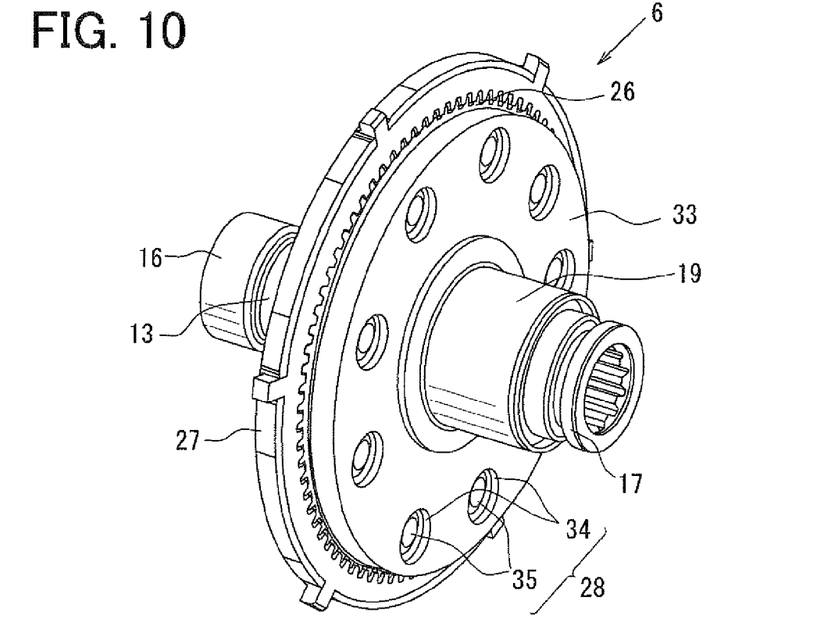
FIG. 10 is a perspective view of a reduction gear viewed from a front side.

An example of the reduction gear unit 6 will be explained with reference to FIGS. 7, 10. The reduction gear unit 6 of this embodiment is an internal engagement planetary reduction gear (cycloid reduction gear) that is a kind of a planetary reduction gear. The reduction gear unit 6 has a sun gear (inner gear: external tooth gear) 26 attached to the rotor shaft 13 via an eccentric portion 25 provided in the rotor shaft 13 and eccentrically rotating, a ring gear (outer gear: internal tooth gear) 27 with which the sun gear 26 inscribes and engages, and a transmission means 28 transmitting only a rotation component of the sun gear 26 to an output shaft 17.

The eccentric portion 25 is an axis for making the sun gear 26 rotate eccentrically relative to a rotation center of the rotor shaft 13. The eccentric portion 25 rotatably supports the sun gear 26 via a sun gear bearing 31 disposed on a periphery thereof. As described above, the sun gear 26 is rotatably supported by the eccentric portion 25 of the rotor shaft 13 via the sun gear bearing 31, and rotates in a state of being pressed onto the ring gear 27 when the eccentric portion 25 rotates. The ring gear 27 is fixed to the front housing 18.

The transmission means 28 is composed of plural inner pin holes 34 formed on the same circumference in a flange 33 rotating together with the output shaft 17 and plural inner pins 35 formed in the sun gear 26 and loosely fitted in the inner pin holes 34 respectively. The plural inner pins 35 are formed in a front face of the sun gear 26 so as to project therefrom. The plural inner pin holes 34 are formed in the flange 33 provided at the rear end of the output shaft 17. By loosely fitting the inner pins 35 into the inner pin holes 34, the rotation movement of the sun gear 26 is transmitted to the output shaft 17.

When the rotor shaft 13 rotates and the sun gear 26 eccentrically rotates, the sun gear 26 rotates at a reduced speed relative to the rotor shaft 13, and the rotation of the reduced speed is transmitted to the output shaft 17. The output shaft 17 is connected to a control rod 45 (described later) for driving and operating the shift range switching unit 3 and parking switching unit 4.

It is to be noted that, differently from the embodiment described above, plural inner pin holes 34 may be formed in the sun gear 26 and plural inner pins 35 may be provided in the flange 33.

(Description of Shift Range Switching Unit 3 and Parking Switching Unit 4)

The shift range switching unit 3 and parking switching unit 4 are driven and switched by the output shaft of the SBW actuator 1 (specifically, the output shaft 17 of the reduction gear unit 6).

The shift range switching unit 3 controls an engagement state of an oil hydraulic clutch by sliding a manual spool valve 42 provided in a hydraulic valve body 41 at an adequate position in accordance with a shift range so as to switch oil pressure supplying paths to the hydraulic clutch of the automatic transmission 2.

The parking switching unit 4 carries out a changeover of a lock (parking state) and unlock (parking release state) of a parking gear 43 by a park pole 44 rotatably supported on a fixed portion (for example, a housing of the automatic transmission 2) and engaging with or disengaging from a parking gear 43 which is interlocked with a drive shaft of a vehicle and rotates together. In more details, by an engagement or disengagement between a notch 43a of the parking gear 43 and a projecting portion 44a of the park pole 44, the changeover of the lock and unlock of the parking switching unit 4 is carried out. When the rotation of the parking gear 43 is interrupted by the park pole 44, driving wheels of the vehicle are locked via a drive shaft, differential gear and so on, so that a parking state of the vehicle is achieved.

A fan-shaped detent plate 46 is attached on a control rod 45 driven by the SBW actuator 1 so that the control rod 45 and the detent plate 46 rotate together. The detent plate 46 has a plurality of notches 46a on a tip portion in a radial direction (a circular arc portion of a fan shape). When an engagement portion 47a provided at a front end of a detent spring 47 fixed on the hydraulic valve body 41 (or an inside of the automatic transmission 2) engages with one of the notches 46a, selected shift range is maintained. Although a detent mechanism using a plate spring is shown in this embodiment, other detent mechanism using a coil spring and so on may be employed.

The detent plate 46 has a pin 48 for driving the manual spool valve 42. The pin 48 fits in an annular groove 49 formed at an end of the manual spool valve 42. When the detent plate 46 is rotated by the control rod 45, the pin 48 is driven so as to draw a circular arc, so that the manual spool valve 42 engaging with the pin 48 moves straight inside the hydraulic valve body 41.

If the control rod 45 rotates clockwise when viewed from a direction of an arrow A in FIG. 6, the pin 48 pushes the manual spool valve 42 into the inside of the hydraulic valve body 41 so that the oil paths in the hydraulic valve body 41 are changed in the order of D, N, R, and P. That is, the shift range of the automatic transmission 2 is changed in the order of D, N, R, and P.

If the control rod 45 rotates counterclockwise, the pin 48 pulls the manual spool valve 42 out of the hydraulic valve body 41 so that the oil paths in the hydraulic valve body 41 are changed in the order of P, R, N, and D. That is, the shift range of the automatic transmission 2 is changed in the order of P, R, N, and D.

A park rod 51 is attached to the detent plate 46 to drive the park pole 44. A conical head 52 is provided at a front end of the park rod 51. The conical head 52 is positioned between a projecting portion 53 of a housing of the automatic transmission 2 and the park pole 44. If the control rod 45 rotates clockwise to change the shift range from R to P when viewed from the direction of the arrow A in FIG. 6, the park rod 51 moves in a direction of an arrow B in FIG. 6, so that the conical head 52 raises the park pole 44. At this time, the park pole 44 turns about an axis 44b in a direction of an arrow C in FIG. 6, so that the projecting portion 44a of the park pole 44 fits in one of the notches 43a of the parking gear 43. By this means, a lock state of the parking switching unit 4 (parking state) is achieved.

If the control rod 45 rotates counterclockwise to change the shift range from P to R, the park rod 51 is pulled back in a direction opposite to the direction of the arrow B in FIG. 6, so that biasing force for raising the park pole 44 disappears. Because the park pole 44 is biased by a coil spring (not shown) in a direction opposite to the direction of the arrow C in FIG. 6, the projecting portion 44a of the park pole 44 disengages from one of the notches 43a of the parking gear 43. As a result, the parking gear 43 becomes free, and an unlock state of the parking switching unit 4 (parking release state) is achieved.

(Description of Encoder 60)

As shown in FIG. 7, in the above-described SBW actuator 1, an encoder 60 for detecting a rotation angle of the rotor 11 is mounted within the housing (front housing 18+rear housing 20). By detecting the rotation angle of the rotor 11 by the encoder 60, the SR motor 5 can be driven at a high speed without causing loss of synchronism.

The encoder 60 is an increment type and is composed of a permanent magnet 61 rotating together with the rotor 11 and hole ICs 62 which are disposed so as to face to the magnet 61 in the rear housing 20 and detect the passage of a magnetic flux generating portion in the magnet 61 (for example, a magnetic flux hole IC for detecting magnetic fluxes from multi-polarized portions in the magnet 61, an index signal hole IC for detecting a magnetic flux generated each time electricity supply makes a round of each phase of the exciting coils 22 and so on). The hole ICs 62 are supported by a substrate 63 fixed in the rear housing 20.

(Description of SBW ECU 7)

Figure 5:
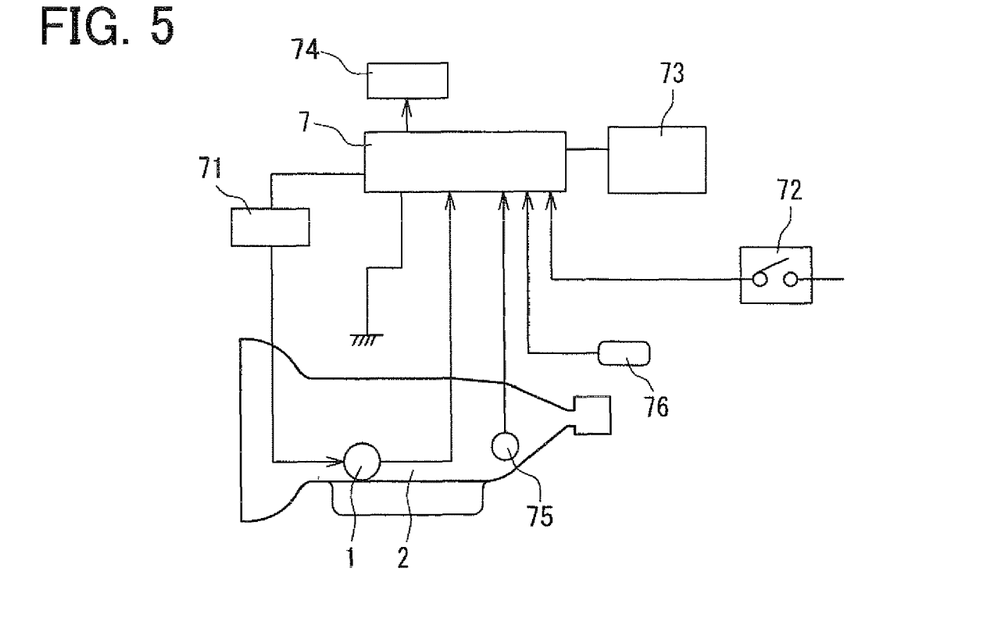
FIG. 5 is a system diagram of a shift range switching apparatus.

The SBW ECU 7 will be explained with reference to FIG. 5. The SBW ECU 7 carries out an energizing control of the SR motor 5. The SBW ECU 7 has a well-known microcomputer composed of a CPU performing control processing and arithmetic processing, storing means (ROM, RAM, SRAM, EEPROM and so on) for storing various programs and data, an input circuit, an output circuit, a power supply circuit, and so on. The SBW ECU 7 outputs a control signal to switching elements 71a, 71b (see FIG. 9) in a coil driving circuit 71 which energizes each phase of the exciting coils 22, based on the arithmetic results.

It is to be noted that a number "72" represents an ignition switch (driving switch), a number "73" represents a vehicular battery, a number "74" represents a display device for displaying a state of the shift range switching unit (switching state of the shift range) to a driver, a number "75" represents a vehicle speed sensor, a number "76" represents sensors for detecting vehicular states, including a shift range position set by the driver, a brake switch, and so on.

The SBW ECU 7 has various control programs such as rotor read means (program) for calculating a rotation speed, a number of rotations, a rotation angle of the rotor 11 from the output of the encoder 60, normal control means (program) for controlling the SR motor 5 so that the shift range position detected by the SBW ECU 7 coincides with the shift range position set by shift range operation means (not shown) operated by the driver, hit learning means (program) for carrying out "P-wall hit learning" in which the SR motor 5 is rotated on a parking setting side so that a movable member of the shift range switching unit 3 hits a movement limit (P-wall) on a parking side when a predetermined driving condition is met (for example, the ignition switch 72 is turned on) in order to detect a reference position of the rotor 11.

Features of the Embodiment

Next, features of this embodiment will be explained with reference to FIGS. 1~4.

In order to (1) suppress torque fluctuation of the SR motor 5 at the time of a large current, (2) increase a minimum generation torque of the SR motor 5 at the time of a small current, and (3) prevent an excessive output torque of the SR motor from being generated, the following means are adopted in this embodiment.

Figure 1A:
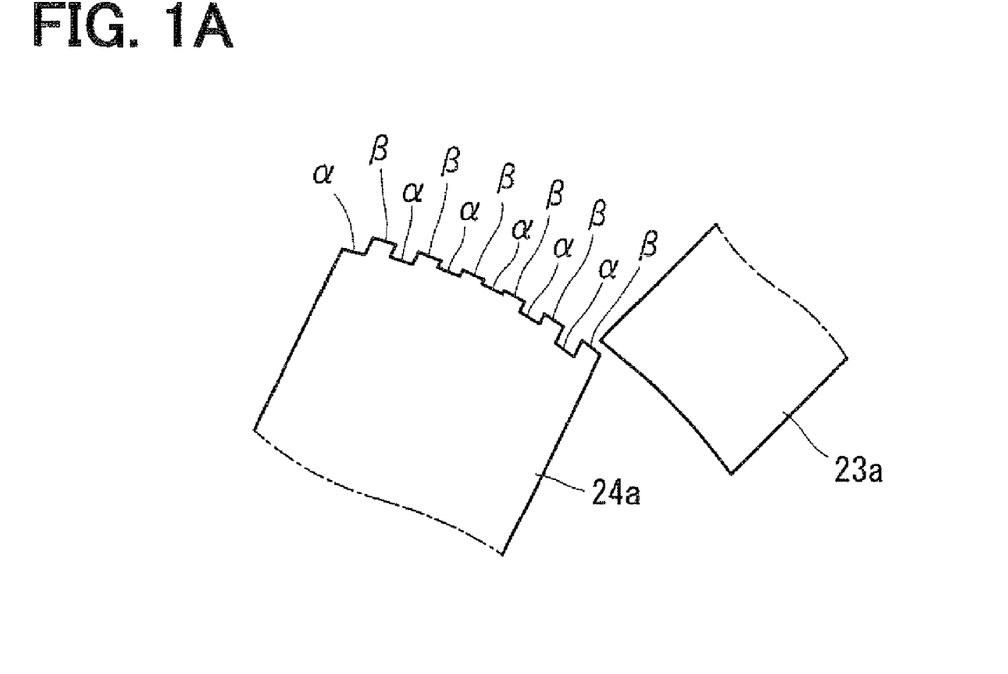
Figure 1B:
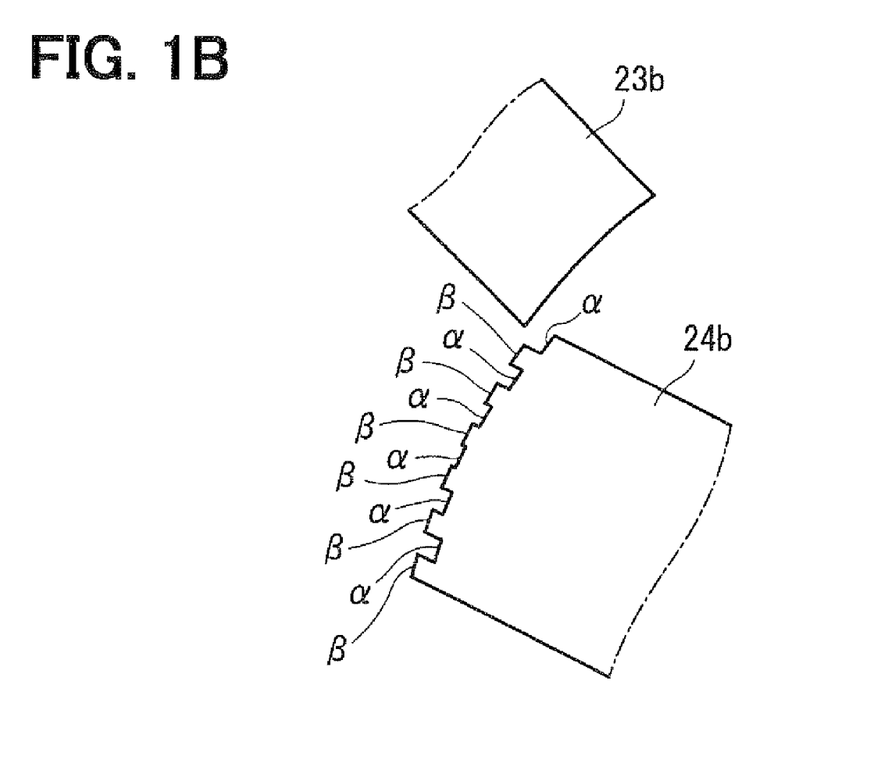
FIG. 1B is an enlarged diagram of a rotor tooth 24b which is the other of the rotor teeth forming the pair and a stator tooth 23b magnetically attracting the rotor tooth 24b.

A plurality of concavities and convexities in which concave portions α and convex portions β are alternately formed along a rotation direction of the rotor 11 is provided on tips of all rotor teeth 24 of the SR motor 5. The heights of plural convex portions β (distances in a radial direction from a rotation center to tips of the convex portions β: distances for forming air gaps to the stator teeth 23) are set to be substantially identical.

To the contrary, the depths of the concave portions α (lengths in the radial direction from the tips of the convex portions β to the bottoms of the concave portions α) are deep on an edge side where the stator tooth 23 and rotor tooth 24 first approach when the rotor 11 rotates and are gradually shallow toward the direction in which a facing area between the stator tooth 23 and rotor tooth 24 increases.

In more details, when the rotor 11 rotates clockwise, the most right-hand side concave portion α has the deepest depth, and the depths of the concave portions α becomes gradually shallower toward a left-hand side. Conversely, when the rotor 11 rotates counterclockwise, the most left-hand side concave portion α has the deepest depth, and the depths of the concave portions α becomes gradually shallower toward a right-hand side.

If the rotor 11 is of a type rotatable in normal and reverse directions or a type of no designation of a rotation direction, the depths of the concave portions α are the deepest on both the most right-hand and left-hand sides of the tip of the rotor tooth 24 and becomes gradually shallower toward a mid section of the tip.

Because the rotor 11 in the SR motor 5 of this embodiment is of the type rotatable in both normal and reverse directions, as shown in FIGS. 1A, 1B, the depths of the concave portions α are the deepest on both the most right-hand and left-hand sides of the tip of the rotor tooth 24 and are the shallowest at the mid section of the tip.

In the prior art (Japanese Patent Publication No. 2002-10595), the depths of concave portions in the plurality of concavities and convexities are all the same and set based on a balance of the maximum torque generated at an early stage of the stator tooth 23 and rotor tooth 24 facing each other and the minimum torque generated when the facing area between the stator tooth 23 and rotor tooth 24 increases.

In the present embodiment, the depth of the concave portion α on the edge side where the stator teeth 23 and rotor teeth 24 first approach when the rotor 11 rotates is set to be deeper than the depth of the concave portion α in the prior art. Here, the deeper the depth of the concave portion α is, the lower the minimum torque is. Therefore, the depth of the concave portion α on the edge side is set based on a necessary minimum torque. In addition, the shallowest depth of the concave portion α (the depth of the concave portion α at the mid section of the tip of the rotor tooth 24 in this embodiment) is set to be shallower than the depth of the concave portion α in the prior art.

As described above, the stator teeth 23 include the pair of the stator teeth around which U-phase exciting coil 22 is wound, the pair of the stator teeth around which V-phase exciting coil 22 is wound, and the pair of the stator teeth around which W-phase exciting coil 22 is wound, When the U-phase, V-phase and W-phase exciting coils 22 are selectively energized, the pairs of the stator teeth 23a,23b magnetically attract the pair of the rotor teeth 24a,24b.

As shown in FIGS. 1a,1b, the orders of the concavities and convexities formed in the pair of the rotor teeth 24a,24b are in opposite relation (in opposite phase) along a rotation direction of the rotor 11, As a result, when the rotor 11 rotates, the facing area between the stator tooth 23a,23b and one of the rotor teeth 24a,24b forming the pair expands in the order of the convex portion β, concave portion α, convex portion β, concave portion α, . . . , and the facing area between the stator tooth 23a,23b and another of the rotor teeth 24a,24b forming the pair expands in the order of the concave portion α, convex portion β, concave portion α, convex portion β, . . . That is, when the facing area between the stator tooth 23a,23b and rotor tooth 24a,24b changes in response to the rotation of the rotor 11, air gaps between the stator teeth 23a,23b and rotor teeth 24a,24b become narrow by the convex portion β on one of the rotor teeth 24a,24b forming the pair and becomes wide by the concave portion α on another of the rotor teeth 24a,24b forming the pair. By this means, a changing degree of an average air gap in the pair of the rotor teeth 24a,24b can be made small and thereby torque fluctuation caused by the concavities and convexities can be prevented from being generated.

Effects of the Embodiments

At the Time of Maximum Current

Because the depths of the concave portions α are deep on the edge side where the stator tooth 23 and rotor tooth 24 first approach, an average air gap between the stator tooth 23 and rotor tooth 24 becomes wide at an early stage of the stator tooth 23 and rotor tooth 24 facing each other. By this means, because magnetic resistance between the stator tooth 23 and rotor tooth 24 becomes high, as shown by a solid line A in FIG. 2B, a changing rate of inductance can be made small as compared with the prior art shown by the dotted line A'. As a result, as shown by a solid line B in FIG. 4, a maximum generation torque can be suppressed as compared with the prior art shown by the dotted line B'.

In addition, because the depths of the concave portions α are shallow as the facing area between the stator tooth 23 and rotor tooth 24 increases, the average air gap becomes narrow. By this means, because the magnetic resistance between the stator tooth 23 and rotor tooth 24 becomes low, as shown by the solid line A in FIG. 2B, the changing rate of inductance can be made large as compared with the prior art shown by the dotted line A'. As a result, as shown by the solid line B in FIG. 4, the drop of the output torque can be suppressed as compared with the prior art shown by the dotted line B'.

In this way, the output torque can be suppressed at the early stage of the stator tooth 23 and rotor tooth 24 facing each other when a large current is given to the exciting coil 22, and the drop of the output torque can be suppressed as the facing area increases. By this means, torque fluctuation can be suppressed when the large current is given to the exciting coil 22.

(At the Time of Minimum Current)

Because the concave portions α are made shallow as the facing area between the stator tooth 23 and rotor tooth 24 increases, the average air gap becomes narrow. By this means, because the magnetic resistance between the stator tooth 23 and rotor tooth 24 becomes low, as shown by a solid line C in FIG. 3B, the changing rate of inductance can be made large as compared with the prior art shown by the dotted line C'. As a result, as shown by the solid line D in FIG. 4, the drop of the output torque can be suppressed as compared with the prior art shown by the dotted line D' when the facing area between the stator tooth 23 and rotor tooth 24 increases. Therefore, the minimum generation torque can be increased by a torque T1 as compared with the prior art when the minimum current is given to the exciting coil 22.

(At the Time of Maximum Current)

Because the concave portions α are made deep on the edge side where the stator tooth 23 and rotor tooth 24 first approach, the average air gap between the stator tooth 23 and rotor tooth 24 becomes wide at the early stage of the stator tooth 23 and rotor tooth 24 facing each other. By this means, because the magnetic resistance between the stator tooth 23 and rotor tooth 24 becomes high, as shown by the solid line A in FIG. 2B, the changing rate of inductance can be made small as compared with the prior art shown by the dotted line A'. In other words, the maximum generation torque can be decreased by a torque T2 as compared with the prior art shown by the dotted line B' when the maximum current is given to the exciting coil 22.

In this way, because the excessive output torque can be prevented from being generated at the early stage of the stator tooth 23 and rotor tooth 24 facing each other when the maximum current is given to the exciting coil 22, it is possible to avoid the possibility that loads driven by the SR motor 5 are mechanically damaged.

For example, in a state where the SR motor 5 is supplied with the maximum current under conditions of a low temperature and a high battery voltage, even though the "P-wall hit learning" in which the movable member of the shift range switching unit 3 hits the movement limit (P-wall) on a parking side is carried out in order to detect the reference position of the rotor 11, it is possible to prevent the loads driven by the SR motor 5 from being mechanically damaged.

(Modifications)

In the embodiment described above, the shapes of the concavities and convexities are rectangle. However, the shapes of the concavities and convexities may be curved.

In the embodiment described above, lengths of the bottoms of the concave portions α (concave portion pitch) are constant along the rotation direction. However, the lengths of the bottoms of the concave portions α may be made long on the edge side where the stator tooth 23 and rotor tooth 24 first approach and made short toward the direction in which the facing area between the stator tooth 23 and rotor tooth 24 increases.

In the embodiment described above, lengths of the tips of the convex portions β (convex portion pitch) are constant along the rotation direction. However, the lengths of the tips of the convex portions β may be made short on the edge side where the stator tooth 23 and rotor tooth 24 first approach and made long toward the direction in which the facing area between the stator tooth 23 and rotor tooth 24 increases.

In the embodiment described above, the concavities and convexities are provided on the tips of the rotor teeth 24. However, the concavities and convexities may be provided on the tips of the stator teeth 23 or the tips of the stator teeth 23 and rotor teeth 24.

In the embodiment described above, although the SR motor 5 is used in the SBW actuator 1, the SR motor 5 according to the present invention may be used in the other actuator.

What is claimed is:

1. A switched reluctance motor comprising:
    a stator having a plurality of stator teeth; and
    a rotor having a plurality of rotor teeth,
    wherein a pair of the rotor teeth among the plurality of the rotor teeth are magnetically attracted by a pair of the stator teeth among the plurality of the stator teeth and the rotor rotates when the pair of the stator teeth magnetically attracting the pair of the rotor teeth is successively switched, and
    wherein a plurality of concavities and convexities are alternately formed on at least one of (1) at a tip of every rotor tooth, and (2) at a tip of every stator tooth along a rotation direction of the rotor, and depths of the concavities are deepest on an edge side where the stator tooth and rotor tooth first approach when the rotor rotates and are more shallow toward a direction in which a facing area of the stator tooth and rotor tooth increases.

2. A switched reluctance motor according to claim 1, wherein orders of the concavities and convexities formed in each respective pair of teeth are in opposite relation along the rotation direction of the rotor.

3. A switched reluctance motor according to claim 1, wherein the rotor is of a type rotatable in normal and reverse directions, the depths of the concavities are deepest on both edge sides of the tip of each respective tooth and more shallow toward a mid section of the tip along the rotation direction of the rotor.

4. A switched reluctance motor according to claim 1, wherein lengths of bottoms of the concavities along the rotation direction of the rotor are long on the edge side where the stator tooth and rotor tooth first approach and short toward the direction in which the facing area between the stator tooth and rotor tooth increases.

5. A switched reluctance motor according to claim 1, wherein lengths of tips of the convexities along the rotation direction of the rotor are short on the edge side where the stator tooth and rotor tooth first approach and long toward the direction in which the facing area between the stator tooth and rotor tooth increases.

6. A switched reluctance motor comprising:
a stator having a plurality of stator teeth; and
a rotor having a plurality of rotor teeth,
wherein a pair of the rotor teeth among the plurality of the rotor teeth are magnetically attracted by a pair of the stator teeth among the plurality of the stator teeth and the rotor rotates when the pair of the stator teeth magnetically attracting the pair of the rotor teeth is successively switched,
wherein a plurality of concavities and convexities are alternately formed on at least one of (1) at a tip of a rotor tooth, and (2) at a tip of a stator tooth along a rotation direction of the rotor, and depths of the concavities are deep on an edge side where the stator tooth and rotor tooth first approach when the rotor rotates and are shallow toward a direction in which a facing area of the stator tooth and rotor tooth increases, and
wherein orders of the concavities and convexities formed in each respective pair of teeth are in opposite relation along the rotation direction of the rotor.

7. A switched reluctance motor according to claim 6, wherein the rotor is of a type rotatable in normal and reverse directions, the depths of the concavities are deepest on both edge sides of the tip of each respective tooth and more shallow toward a mid section of the tip along the rotation direction of the rotor.

8. A switched reluctance motor according to claim 6, wherein lengths of bottoms of the concavities along the rotation direction of the rotor are longest on the edge side where the stator tooth and rotor tooth first approach and shorter toward the direction in which the facing area between the stator tooth and rotor tooth increases.

9. A switched reluctance motor according to claim 6, wherein lengths of tips of the convexities along the rotation direction of the rotor are shortest on the edge side where the stator tooth and rotor tooth first approach and longer toward the direction in which the facing area between the stator tooth and rotor tooth increases.

10. A switched reluctance motor comprising:
a stator having a plurality of stator teeth; and
a rotor having a plurality of rotor teeth,
wherein a pair of the rotor teeth among the plurality of the rotor teeth are magnetically attracted by a pair of the stator teeth among the plurality of the stator teeth and the rotor rotates when the pair of the stator teeth magnetically attracting the pair of the rotor teeth is successively switched,
wherein a plurality of concavities and convexities are alternately formed on at least one of (1) at a tip of a rotor tooth, and (2) at a tip of a stator tooth along a rotation direction of the rotor, and depths of the concavities are deep on an edge side where the stator tooth and rotor tooth first approach when the rotor rotates and are shallow toward a direction in which a facing area of the stator tooth and rotor tooth increases, and
wherein lengths of bottoms of the concavities along the rotation direction of the rotor are long on the edge side where the stator tooth and rotor tooth first approach and short toward the direction in which the facing area between the stator tooth and rotor tooth increases.

11. A switched reluctance motor according to claim 10, wherein the rotor is of a type rotatable in normal and reverse directions, the depths of the concavities are deepest on both edge sides of the tip of each respective tooth and more shallow toward a mid section of the tip along the rotation direction of the rotor.

* * * * *